US012652147B2

(12) United States Patent
Zachrison et al.

(10) Patent No.: US 12,652,147 B2
(45) Date of Patent: Jun. 9, 2026

(54) CARRIER AGGREGATION IN A RADIO COMMUNICATION NETWORK

(71) Applicant: Telefonaktiebolaget LM Ericsson (publ), Stockholm (SE)

(72) Inventors: Mats Zachrison, Örebro (SE); Peiliang Chang, Åkersberga (SE); Tao Cui, Upplands Väsby (SE); Sven Ekemark, Storvreta (SE); Sofia Svedevall, Brokind (SE); Henning Wiemann, Aachen (DE); Linnea Faxén, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 384 days.

(21) Appl. No.: 18/258,942

(22) PCT Filed: Dec. 23, 2020

(86) PCT No.: PCT/SE2020/051259
§ 371 (c)(1),
(2) Date: Jun. 22, 2023

(87) PCT Pub. No.: WO2022/139644
PCT Pub. Date: Jun. 30, 2022

(65) Prior Publication Data
US 2024/0048338 A1 Feb. 8, 2024

(51) Int. Cl.
*H04L 5/00* (2006.01)

(52) U.S. Cl.
CPC ............ *H04L 5/0091* (2013.01); *H04L 5/006* (2013.01)

(58) Field of Classification Search
CPC .............................. H04L 5/0091; H04L 5/006
See application file for complete search history.

(56) References Cited

U.S. PATENT DOCUMENTS

| | | | |
|---|---|---|---|
| 2012/0244863 A1* | 9/2012 | Burnette | H04W 28/24 |
| | | | 455/436 |
| 2019/0068628 A1* | 2/2019 | Berglund | H04W 36/0072 |

(Continued)

FOREIGN PATENT DOCUMENTS

| | | |
|---|---|---|
| EP | 3723404 A1 | 10/2020 |
| WO | 2015040521 A1 | 3/2015 |

OTHER PUBLICATIONS

International Search Report and Written Opinion dated Sep. 8, 2021 for International Application No. PCT/SE2020/051259 filed Dec. 23, 2020, consisting of 8-pages.

(Continued)

*Primary Examiner* — Kevin M Cunningham
(74) *Attorney, Agent, or Firm* — Weisberg I.P. Law, P.A.

(57) ABSTRACT

A method for selecting one or more secondary cells, SCells for supporting communication with a user equipment, UE, by carrier aggregation, CA. The one or more SCells is/are selected from a set of SCell candidates available for an access node. The method includes estimating a probability that the UE connected to a primary cell, PCell, of the access node is in coverage of an SCell in the set of candidates, predicting available resources for the SCell, calculating a CA value for the SCell based on the estimated probability, an estimated spectral efficiency and the predicted available resources, and calculating a CA value for each SCell of the set of SCell candidates, ranking the SCells of the set of SCell candidates based on their calculated CA values, and selecting one or more SCells for providing CA with the UE based on the ranking.

17 Claims, 5 Drawing Sheets

(56) References Cited

U.S. PATENT DOCUMENTS

| 2020/0106536 A1 | 4/2020 | Bedekar |
| 2020/0252846 A1 | 8/2020 | Ozturk et al. |
| 2021/0315023 A1* | 10/2021 | Tesanovic ......... H04W 74/0833 |

OTHER PUBLICATIONS

EPO Communication with Extended European Search Report dated Dec. 13, 2024 for Patent Application No. 20967142.9, consisting of 10 pages.

* cited by examiner

CARRIER AGGREGATION IN A RADIO COMMUNICATION NETWORK

CROSS-REFERENCE TO RELATED APPLICATION

This application is a Submission Under 35 U.S.C. § 371 for U.S. National Stage Patent Application of International Application Number: PCT/SE2020/051259, filed Dec. 23, 2020 entitled "CARRIER AGGREGATION IN A RADIO COMMUNICATION NETWORK," the entirety of which is incorporated herein by reference.

TECHNICAL FIELD

The present disclosure relates to a method for carrier aggregation in an access node of a radio communication network.

BACKGROUND

Carrier aggregation (CA) is an effective technique in long term evolution (LTE) and new radio (NR) to enhance user throughput. With CA, a user equipment (UE) can be served with multiple carrier components (CC) and access larger bandwidth than being served with only one carrier. To apply CA, a UE firstly establishes radio resource control (RRC) connection with a primary serving cell (PCell). The PCell then adds and removes secondary serving cells (SCell) to/from the UE with RRC reconfiguration message. In order to improve user throughput, an added SCell should have not only a good radio link to the UE but also large amount of radio resources to serve the UE, i.e., the added SCell shouldn't be heavily loaded. How to properly configure the SCells of a UE is essential in the application of CA.

A cell has a list of candidate SCells. When a new UE gets RRC connected with the cell, the cell can choose one or multiple SCells from the candidate list and configure them with the UE. Different methods can be applied to select the SCells to be configured with the UE. One way is to blindly select the SCells and configure them with the UE. Another way is to ask the UE to make certain radio measurements and select the SCells based on the measurement results.

Problems with blindly selecting SCells are multi-fold. Firstly, the selected SCells may not provide a coverage towards the UE so that the UE cannot be served by the selected SCell. Secondly, even if the UE is well covered by the selected SCell, the SCell may be highly loaded and cannot serve the UE with much radio resource. Lastly, selected SCells that are of no or little use may prevent configuration of other SCells, due to limited UE capability for SCells, so the SCells should be selected with care.

Configuring CA based on UE-measurement also have some problems. Firstly, it consumes RRC resources to ask the UE to conduct inter-frequency measurements. Secondly, UE measurements would result in throughput loss due the fact the base station needs to wait for the measurement results before it can select and configure SCells, and due to the measurement gaps needed. Another disadvantage with UE measurements is the battery consumption of the UE.

SUMMARY

One objective is to provide a fast, secondary cell (SCell) configuration in an access node of a radio communication network.

According to a first aspect there is presented a method in an access node of a radio communication network. The method is for selecting one or more SCells for supporting communication with a user equipment (UE) by carrier aggregation (CA). The one or more SCells is/are selected from a set of SCell candidates available for the access node. The method comprises estimating a probability that the UE connected to a primary cell (PCell) of the access node is in coverage of an SCell in the set of SCell candidates, estimating a spectral efficiency of a link between the UE and the SCell, predicting available resources for the SCell, calculating a CA value for the SCell based on the estimated probability, the estimated spectral efficiency and the predicted available resources, performing the estimating a probability, estimating a spectral efficiency, predicting available resources, and calculating a CA value for each SCell of the set of SCell candidates, ranking the SCells of the set of SCell candidates based on their calculated CA values, and selecting one or more SCells for providing CA with the UE based on the ranking of the respective SCell in the set of SCell candidates.

By ranking a set of available SCell candidates, SCell configuration can be provided fast and with a high throughput, since layer 3 measurements is avoided.

Adding additional cell resources to a UE with the CA function may be done more or less optimally. This presented method select, through a systematic and data driven approach, the best possible SCells using a fast and accurate method which also involves the predicted resource situation to come.

The probability may be estimated based on inter-frequency channel quality measurements for the SCell collected from one or more inactive UEs connected to the PCell. The probability may be estimated based on an average of the inter-frequency channel quality measurements.

The spectral efficiency may be estimated based on inter-frequency channel quality measurements for the SCell collected from one or more inactive UEs connected to the PCell. The spectral efficiency may be estimated based on an average of the inter-frequency channel quality measurements.

The available resources for the SCell may be predicted based on usage history of the SCell.

The method may further comprise estimating an inter-node transport link quality value between the PCell and the SCell, wherein the CA value for the SCell is further based on the estimated inter-node transport link quality value.

The presented method may also increase the throughput by taking load into consideration and making sure to avoid cells where the UE would not be assigned radio resources.

The presented method may increase the throughput further by predicting the future cell load and using cell available resources when it will be used rather than historic load data.

According to a second aspect there is presented an access node of a radio communication network for selecting one or more SCells for supporting communication with a UE by CA. The one or more SCells is/are selected from a set of SCell candidates available for the access node. The access node comprises a processing circuitry and a computer program product storing instructions that, when executed by the processing circuitry, causes the access node to estimate a probability that the UE connected to a PCell of the access node is in coverage of an SCell in the set of SCell candidates, estimate a spectral efficiency of a link between the UE and the SCell, predict available resources for the SCell, calculate a CA value for the SCell based on the estimated probability, the estimated spectral efficiency and the predicted available resources, perform the estimate a probability, estimate a spectral efficiency, predict available resources, and calculate a CA value for each SCell of the set of SCell candidates, rank the SCells of the set of SCell candidates based on their calculated CA values, and to select one or more SCells for providing CA with the UE based on the ranking of the respective SCell in the set of SCell candidates.

According to a third aspect there is presented a computer program of an access node of a radio communication network for selecting one or more SCells for supporting communication with a UE by CA. The one or more SCells is/are selected from a set of SCell candidates available for the access node. The computer program comprises computer program code which, when run in an access node causes the access node to estimate a probability that the UE connected to a PCell of the access node is in coverage of an SCell in the set of SCell candidates, estimate a spectral efficiency of a link between the UE and the SCell, predict available resources for the SCell, calculate a CA value for the SCell based on the estimated probability, the estimated spectral efficiency and the predicted available resources, perform the estimate a probability, estimate a spectral efficiency, predict available resources, and calculate a CA value for each SCell of the set of SCell candidates, rank the SCells of the set of SCell candidates based on their calculated CA values, and to select one or more SCells for providing CA with the UE based on the ranking of the respective SCell in the set of SCell candidates.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

A data driven method for the evaluation of secondary cell (SCell) candidates in carrier aggregation (CA) is presented. In this method, for a given cell, all its SCell candidates are ranked based on an estimated SCell utility. The SCell utility is estimated based on both radio measurement data and cell load data. The SCell candidates that have higher utility are higher prioritized and hence more preferred to be selected for a newly connected user equipment (UE). The method estimates coverage and load and includes this into a CA value which will improve the SCell selection.

Figure 1:
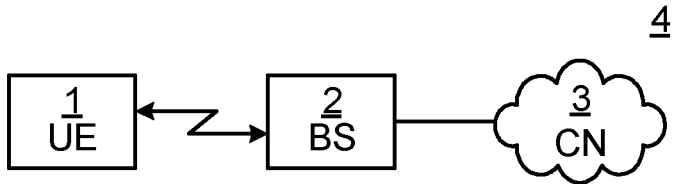
FIG. 1 is a diagram schematically illustrating an environment wherein embodiments presented herein can be implemented.

An environment wherein embodiments presented herein can be implemented is presented with reference to FIG. 1. A UE 1 is on connectivity with a base station 2. The base station 2 is in turn connected to a core network 3. The environment is a radio communication network 4 that is 3GPP compliant. The base station 2 may be a gNB.

Figure 2:
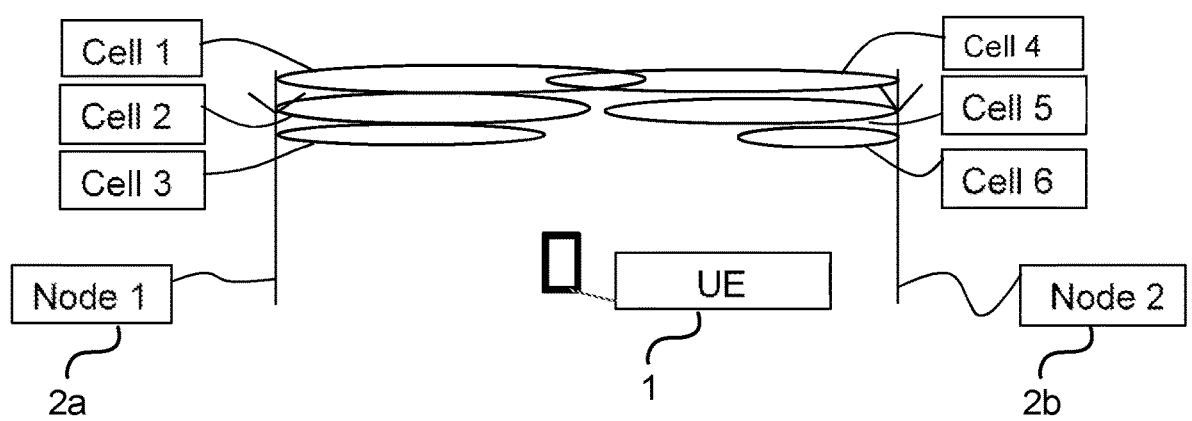
FIG. 2 is a diagram schematically illustrating a system wherein an embodiment is presented herein.

Consider a radio communication system which comprises at least one access node and at least two carriers (cells). One example of such a system is shown in FIG. 2. In this example, there are two access nodes 2a and 2b, wherein access node 2a is called Node 1 and access node 2b is called Node 2. The system further has six cells, Cell 1-6. Cell 1-3 is on Node 1, and Cell 4-5 is on Node 2. Cell 1 on Node 1 provides a radio resource control (RRC) connection with a UE 1. After establishing RRC connection with the UE 1, Node 1 also assigns one or more SCells to UE 1. The purpose of assigning one or more SCells to the UE is that the SCells shall support the UE with carrier aggregation connectivity. Cell 1 is the primary cell, PCell, for UE 1, and Cell 1 has a list of SCell candidates, which is {Cell 2, Cell 3, Cell 4, Cell 5 and Cell 6} in this example.

Figure 3:
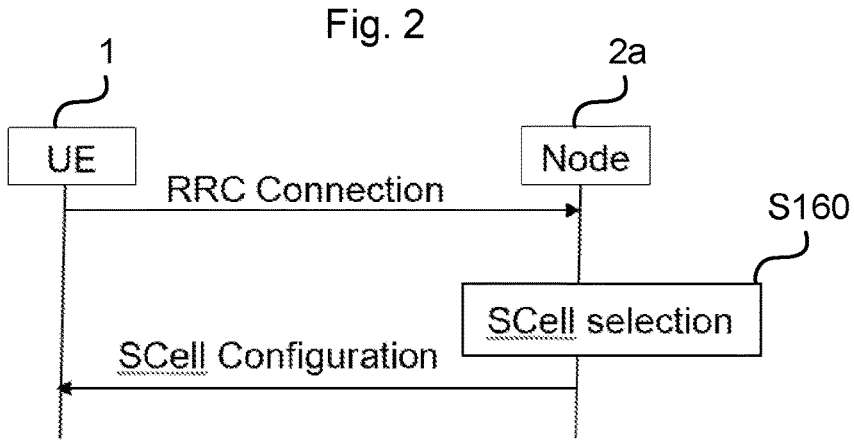
FIG. 3 is a signal flow schematically illustrating SCell configuration for the system shown in FIG. 2.

The signalling flow of the SCell configuration is shown in FIG. 3. The UE 1 establishes an RRC connection with Cell 1 of Node 1. One or more SCells are selected in processing block S160, and an SCell configuration is thereafter communicated back to the UE 1. Due to UE capabilities, Node 1 cannot in this example configure all SCells 2-6 to the UE 1. The problem for the selection is which SCell candidates should be selected and assigned to the UE 1.

Figure 4:
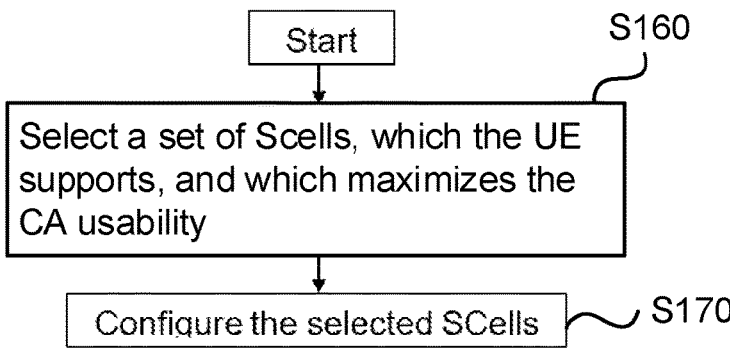
FIGS. 4-7 are flowcharts schematically illustrating embodiments presented herein.

FIG. 4 shows the process of SCell selection and assigning. In processing block S160 a set of SCells is selected from the list of candidate SCells that the UE supports, and which maximizes the CA usability. The selected set of SCells are configured in processing block S170 by sending an RRC message to the UE.

A method is presented which consider coverage and load in the above SCell configuration problem. In this method, a CA value is calculated for all the SCell candidates for the UE. The CA value of an SCell candidate is the estimated throughput this specific UE would get by using the candidate as an SCell. The larger the usability is, represented by the CA value metric, the higher throughput can be expected from the SCell candidate. A basic CA value could be the cell's bandwidth, BW, since a carrier with larger BW likely would yield higher throughput. However, the carrier might not even be in coverage of the UE, or a lot of other UEs may already be using this cell, making the effective throughput much less and the BW a poor representation.

In another example, there may be two SCell candidates with the same carrier configurations (i.e. similar frequency, BW, etc.), however one of them has a higher probability to be in coverage, and/or has more available resources on average. The better of the two cells can be selected and configured for the UE, based on the usability represented by the CA value.

In another example, there may be two SCell candidates with the same carrier configurations (i.e. similar frequency, BW, etc.) and same coverage probability, however these two cells may be on difference access nodes than the access node where the primary cell is. The qualities of the transport links between the two candidate secondary access nodes and the primary access node could be different. CA via the SCell candidate with lower transport latency and larger transport bandwidth could be more performant than the other one. Therefore, the SCell candidate with lower transport latency and larger transport bandwidth may be selected and configured for the UE.

During SCell selection, a set of SCells may be selected for the UE, and it is then not enough to find out which single cell that provides the highest throughput. For example, due to UE capabilities a UE may be able to select only Cell 2, or Cell 3, 4 and 4. Even if cell 2 has a higher throughput, the set {3, 4, 5} may together provide a higher throughput. This makes the SCell selection problem complex, and with a better representation of the achievable throughput of each SCell candidate, a better estimate can be done on which set that is the best. For example, if Cell 2 alone provides higher throughput than the set {3, 4, 5}, but the probability of Cell 2 being in coverage is very low, and the difference in throughput is not very big, the set {3, 4, 5} might be preferred.

Figures 5, 6:
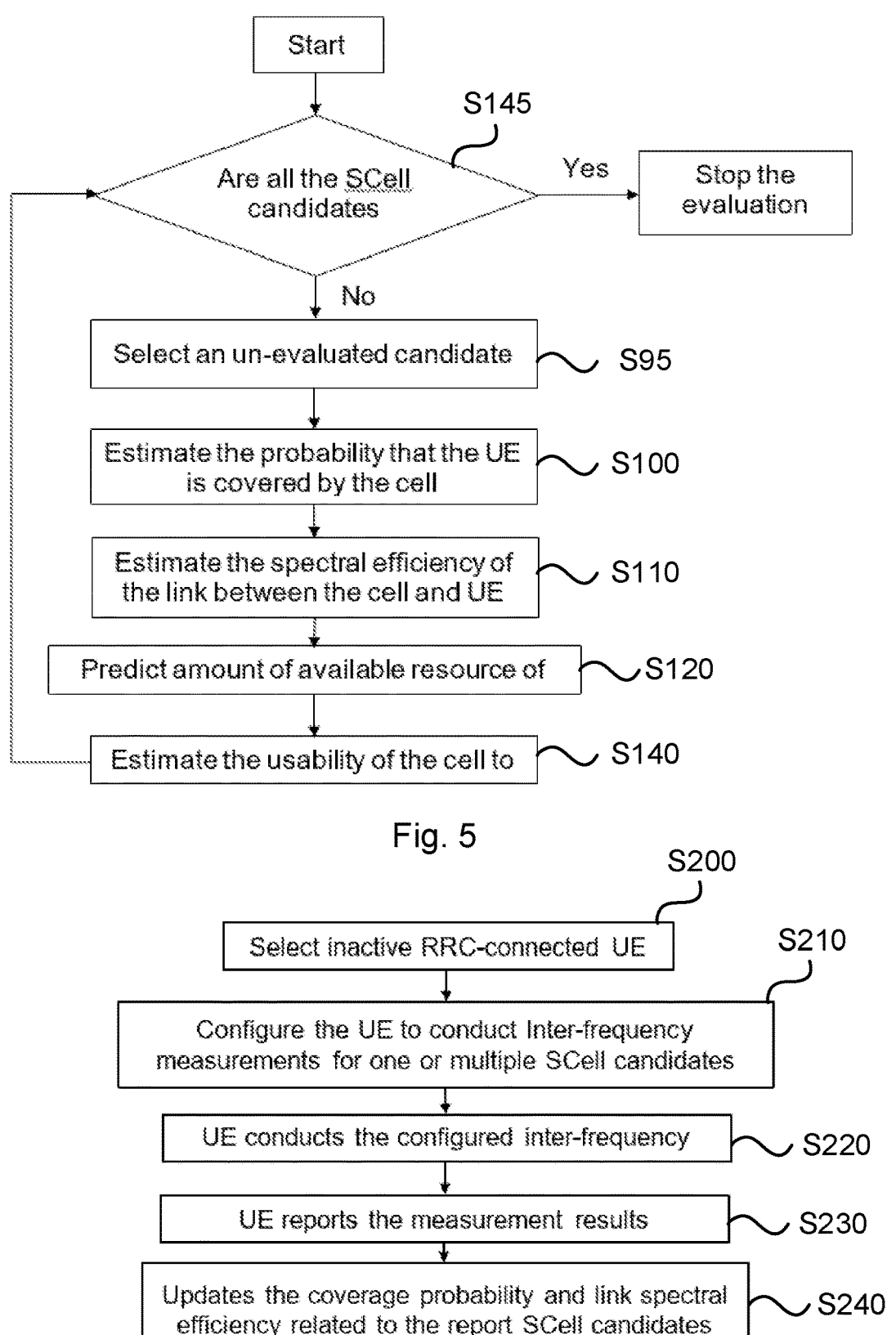

A key step in the presented SCell configuration solution is to evaluate each SCell candidates' CA value to the UE. A process of estimating all candidates' CA value is shown in FIG. 5. In this process, it is checked in processing block S145 is all SCell candidates have been evaluated. If all SCell candidates have been evaluated the process is stopped. Otherwise, an un-evaluated candidate is selected in processing block S95. An estimate of the probability that the UE is covered by the candidate subject to certain coverage criteria is then made in processing block S100. Then the spectral efficiency of the radio link between the UE and the candidate is evaluated in processing block S110. Following that, the amount of available radio resources of the candidates is predicted in processing block S120. In the end, with the above predicted coverage probability, spectral efficiency and the amount of available resource, the candidate's CA value is estimated in processing block S140.

The CA value estimation process can be UE-blind or UE-specific. For the UE-blind solution, no information of the UE is used to estimate the coverage probability and the link spectral efficiency. These two metrics are estimated as the average values of the coverage probability and link spectral efficiency for all UEs with the current cell used as PCell, meaning that a cell level estimation is made. For the UE-specific solution, based on the UE-blind solution, UE's specific information, such as UE's mobility history or UE's radio link quality with the PCell, is further used to estimate the coverage probability and link spectral efficiency. For the UE-specific solution, the CA value estimation process is conducted when a new UE gets RRC connected, while for the UE-blind solution, the CA value estimation can be less frequent and may follow certain period. The process may e.g. be executed when a new prediction of cell resource is made. The selection of the set of SCells based on the CA value estimation is always UE-specific and done for example when a new UE gets RRC connected.

The estimation of coverage probability and the link spectral efficiency of an SCell candidate may be achieved with the help of RRC-connected but inactive UEs. As illustrated in FIG. 6, during low load periods, Cell 1 asks the RRC-connected but inactive UEs to conduct inter-frequency measurements on its SCell candidates. These UEs conduct such measurements and report the measured reference signals received power (RSRP) and reference signal received quality (RSRQ). With the reported RSRP and RSRQ, cell 1 calculates the probability that a UE which gets RRC connection with Cell 1 will be covered by the corresponding SCell candidate and calculate the average spectral link efficiency between a UE which gets RRC connection with Cell 1 and the corresponding SCell candidate. In processing block S200 an inactive UE, RRC connected with the PCell of the access node is selected. In processing block S210 the selected UE is configured to conduct inter-frequency measurements for one or more SCell candidates. In processing block S220 the UE performs the configured measurements. In processing block S230 the UE reports the result of the measurements. In processing block S240 the coverage probability and link spectral efficiency for the SCells for which the reported measurements are received is determined.

The above estimation of coverage probability and link spectral efficiency is UE-blind, meaning that the estimations are made using data from a set of UEs, and then used for all the UEs that get RRC connected with the same PCell. In another embodiment, the estimations may be improved by considering UE specific information. For example, the UE's mobility history and link quality with the PCell may be used to infer the link quality between the UE and the SCell candidate.

A machine learning model may be developed to forecast the amount of available bandwidth on an SCell candidate. The resource usage history of the SCell candidate may be used as input to the prediction model. And the output of the model may be the amount of the cells' available resources in a future time window. The prediction model may be a linear model, a decision tree model, a random forest model or a neural network model. Given a model structure, the model's coefficients are fitted with labelled training data. Once fitted, the trained model can be used to predict the SCell candidate's available resource amount in the upcoming time window.

The timeframe for a predicted load may be several hours, when the prediction is used to determine offered long term capacity, but may also be as short as the next minute when used for instant SCell assignments. In this context is noted that an access node does not have information about the load on other access nodes, or more explicitly, no information on load for cells managed by other access nodes.

Figure 7:
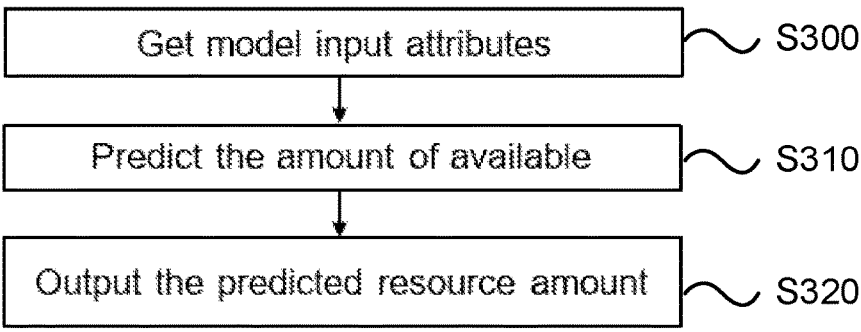

A process to make resource amount prediction is illustrated in FIG. 7. A first processing block S300 is to prepare the model's input attributes. The model input attributes may be, including but not limited to, the following data: number of active users in a cell; number of scheduling events in a cell; number of time fragments where data has been scheduled; usage of physical resource block (PRB) resources in a cell; usage of control channel resources for a cell; Day of week; time interval of day; short average of utilized resources; and long average of utilized resources.

These attributes, aggregated per cell and per time interval, make up the input for predicting availability of cell resources in the next time interval.

Once the input attributes are ready, the resource prediction is made in processing block S310 and then the predicted amount of available resources is output for the CA value estimation in processing block S320.

The CA value of an SCell candidate is a metric used to prioritize the SCell candidates of a PCell when this PCell tries to configure SCells for its connected UEs. The CA value of an SCell candidate is a metric to measure the UE throughput gain from the considered SCell candidate. The UE throughput gain from an SCell candidate depends on multiple factors, such as how is the radio link quality between the SCell candidate and the UE, how much bandwidth is available on the SCell candidate, how is the transport condition between the node of the PCell and the node of the SCell candidate if the SCell candidate is on another node than the PCell. Considering all these factors, multiple variants of SCell candidate CA value may be defined.

In one embodiment, the usability of an SCell candidate may be defined as the coverage probability, which is the probability that a UE on the PCell is covered by the SCell candidate.

In another embodiment, the usability of an SCell candidate may be defined as a joint function of the coverage probability of the SCell candidate and the amount of available bandwidth on the SCell candidate. In one example, this joint function may be the product of these two factors as $u=P_c*B_a$, wherein $P_c$ is the estimated coverage probability and $B_a$ the predicted amount of available bandwidth. In another example, this joint function may be a weighed sum of these two factors as $u=w_{pc}P_c+w_{ba}B_a$, where $w_{pc}$ and $w_{ba}$ are the associated weights of the two factors.

In another embodiment, the usability of SCell candidate may be defined as a joint function of the coverage probability of the SCell candidate, the amount of available bandwidth on the SCell candidate and the spectral efficiency of the link between the UE and the SCell candidates. In one example, this joint function may be the product of these three factors as $u=P_c*S*B_a$ wherein S is the estimated spectral efficiency. In another example, this joint function can be weighed sum of these three factors as $u=w_{pc}P_c+w_{ba}B_a+w_SS$, where $w_S$ is the associated weight of the S factor.

For the SCell candidate that is from an external node than the node where the PCell is, the throughput gain via CA also depends on the bandwidth and latency of transport link between the node of the PCell and the node of the SCell candidate. The impact of inter-node transport link quality can be modelled as a discount factor $\tau$. The value range of $\tau$ is from 0 to 1. $\tau$ is equal to 0 if there is no transport connection between the two nodes and it is equal to 1 if the PCell and the SCell candidate are on the same node. The better the transport link quality is, the larger $\tau$ is.

In another embodiment, the usability of SCell candidate from an external node than the PCell node may be defined as a joint function of the coverage probability of the SCell candidate, the amount of available resources on the SCell candidate, the spectral efficiency of the link between the UE and the SCell candidates, and the transport link quality between the PCell node and SCell candidate node. In one example, this joint function may be the product of these four factors as $u=P_c*S*B_a*\tau$. In another example, this joint function may be weighed sum of these two factors as $u=w_{pc}P_c+w_{ba}B_a+w_SS+w_\tau\tau$, where $w_\tau$ is the associated weight of the $\tau$ factor.

The presented method is execution location agnostic, meaning it can be executed in individual access nodes or more centralized in a traffic management node. With centralized execution further synergy advantages can be reached, but the method itself is fully self-contained for execution on individual network nodes.

In one embodiment the PCell and SCell candidate reside in the same network node, and all the data should be in place for proper SCell candidate selection. In another embodiment the PCell and SCell candidate reside in two different network nodes, and the data samples or the prediction result have to be communicated to the node hosting the PCell in order to enable usability-based selection of the SCell. In yet another embodiment the usability-based selection of SCell candidates reside in an external control node, to which the data used in the process needs to be communicated.

Figure 8:
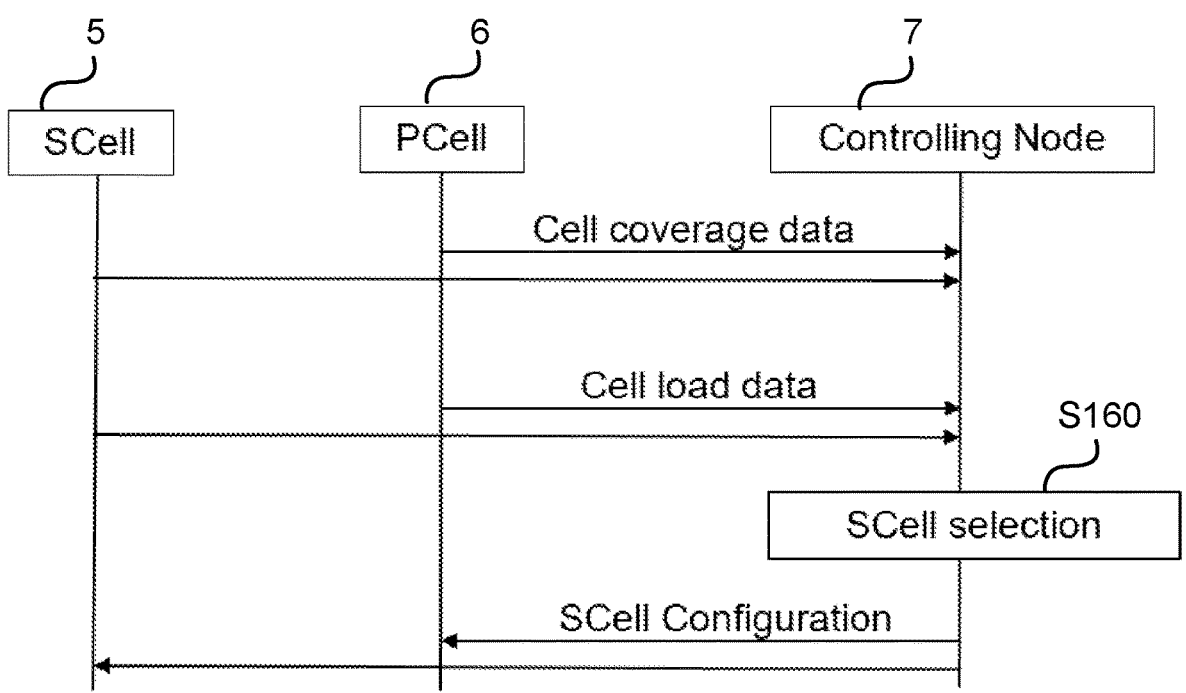
FIG. 8 is a signal flow schematically illustrating of an embodiment presented herein.

A generic signalling flow is outlined between three entities in FIG. 8. The three involved parties, SCell 5, PCell 6 and controlling node 7, may be located in the same physical or virtual entity, or they can be independently distributed in the radio communication network. The optimal distribution is to have three separate entities, but other embodiments are possible. Cell coverage data and cell load data is signalled from the SCell 5 and PCell 6, respectively, to the controlling node 7. An SCell selection S160 is made in the controlling node 7 based on received cell coverage data and cell load data, and SCell configuration information is thereafter sent from the controlling node 7 to the SCell 5 and PCell 6, respectively.

Figures 9, 10, 11:
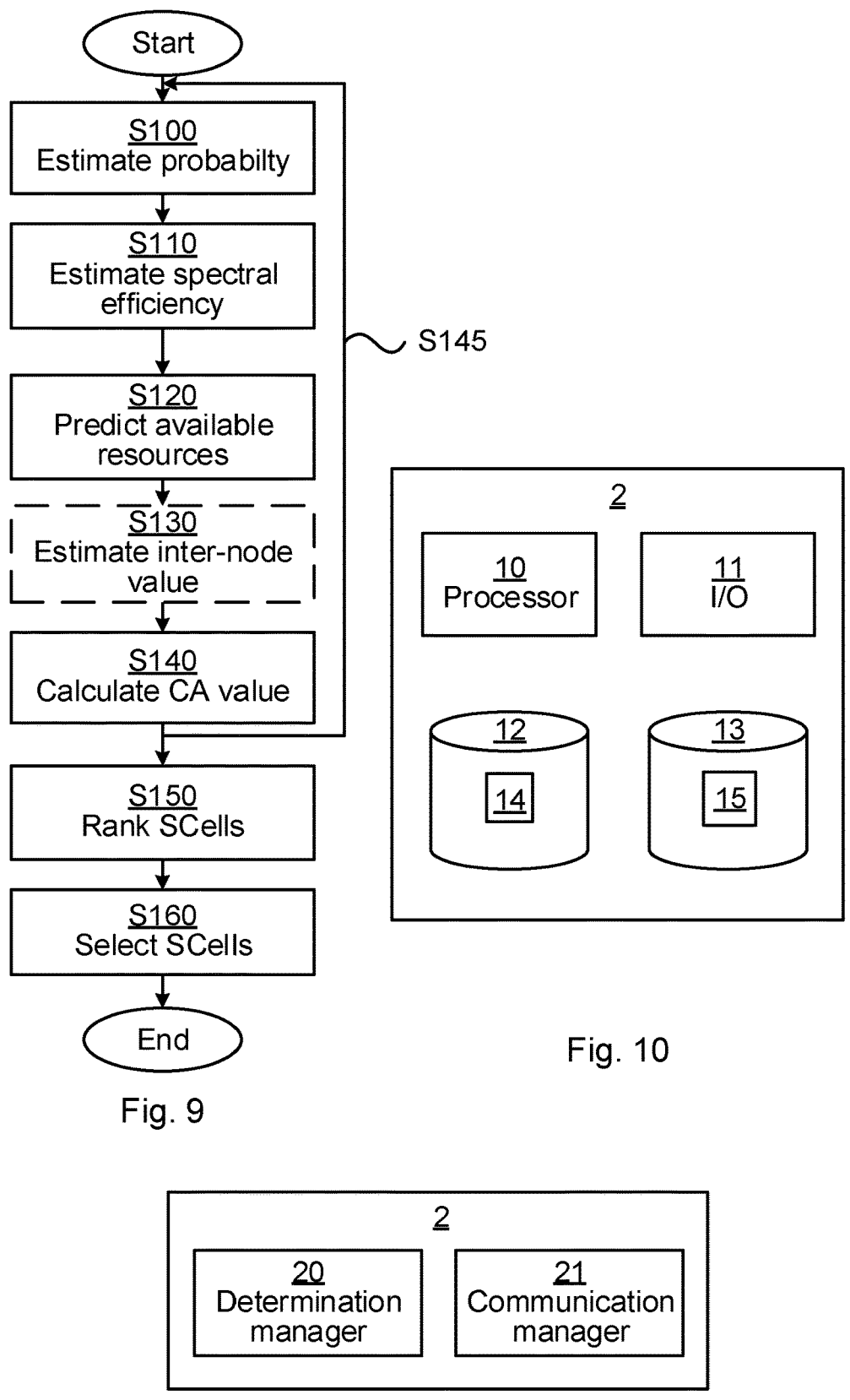
FIG. 9 is a flowchart schematically illustrating an embodiment presented herein.
FIG. 10 is a diagram schematically illustrating some components of devices presented herein.
FIG. 11 is a diagram schematically illustrating functional modules components of devices presented herein.

According to an aspect, an embodiment of a method in an access node of a radio communication network is presented with reference to FIG. 9. The method is for selecting one or more SCells for supporting communication with a UE by CA. The one or more SCells is/are selected from a set of SCell candidates available for the access node. In processing block S100 a probability that the UE connected to a PCell of the access node is in coverage of an SCell in the set of SCell candidates is estimated. In processing block S110 a spectral efficiency of a link between the UE and the SCell is estimated. In processing block S120 available resources for the SCell is predicted. In optional processing block S130 an inter-node transport link quality value between the PCell and the SCell is estimated. In processing block S140 a CA value for the SCell is calculated based on the estimated probability, the estimated spectral efficiency and the predicted available resources. The CA value for the SCell may further be based on the estimated inter-node transport link quality value. In processing blocks S100, S110, S120, optionally S130, and S140 are performed for each SCell of the set of SCell candidates. In processing block S150 the SCells of the set of SCell candidates are ranked based on their calculated CA values. In processing block S160 one or more SCells is selected for providing CA with the UE based on the ranking of the respective SCell in the set of SCell candidates.

The probability may be estimated based on inter-frequency channel quality measurements for the SCell collected from one or more inactive UEs connected to the PCell. The probability may be estimated based on an average of the inter-frequency channel quality measurements.

The spectral efficiency may be estimated based on inter-frequency channel quality measurements for the SCell collected from one or more inactive UEs connected to the PCell. The spectral efficiency may be estimated based on an average of the inter-frequency channel quality measurements.

The available resources for the SCell may be predicted based on usage history of the SCell.

According to an aspect, an embodiment of an access node 2 of a radio communication network is presented with reference to FIG. 10. The access node 2 is for selecting one or more SCells, for supporting communication with a UE by CA. The one or more SCells is/are selected from a set of SCell candidates available for the access node 2. The access node 2 comprises a processing circuitry 10 and a computer program product 12, 13 storing instructions 14, 15. The instructions, when executed by the processing circuitry 10, causes the access node 2 to estimate a probability that the UE connected to a primary cell, PCell, of the access node is in coverage of an SCell in the set of SCell candidates, estimate a spectral efficiency of a link between the UE and the SCell, predict available resources for the SCell, calculate a CA value for the SCell based on the estimated probability, the estimated spectral efficiency and the predicted available resources, perform the estimate a probability, estimate a spectral efficiency, predict available resources, and calculate a CA value for each SCell of the set of SCell candidates, rank the SCells of the set of SCell candidates based on their calculated CA values, and to select one or more SCells for providing CA with the UE based on the ranking of the respective SCell in the set of SCell candidates.

The probability may be estimated based on inter-frequency channel quality measurements for the SCell collected from one or more inactive UEs connected to the PCell. The probability may be estimated based on an average of the inter-frequency channel quality measurements.

The spectral efficiency may be estimated based on inter-frequency channel quality measurements for the SCell collected from one or more inactive UEs connected to the PCell. The spectral efficiency may be estimated based on an average of the inter-frequency channel quality measurements.

The available resources for the SCell may be predicted based on usage history of the SCell.

The access node may further be caused to estimate an inter-node transport link quality value between the PCell and the SCell, wherein the CA value for the SCell is further based on the estimated inter-node transport link quality value.

FIG. 10 is a schematic diagram showing some components of the access node 2. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The memory can thus be considered to be or form part of the computer program product 12. The processing circuitry 10 may be configured to execute methods described herein with reference to FIGS. 4-7 and 9.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the access node 2.

The access node 2 may further comprise an input/output (I/O) interface 11 including e.g. a user interface. The access node 2 may further comprise a receiver configured to receive signalling from other nodes, and a transmitter configured to transmit signalling to other nodes (not illustrated). Other components of the access node 2 are omitted in order not to obscure the concepts presented herein.

FIG. 11 is a schematic diagram showing functional blocks of the access node 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the process blocks in the method illustrated in FIGS. 4-7 and 9, comprising a determination manager unit 20, and a communication manger unit 21. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 20 is for selecting one or more SCells, for supporting communication with a UE by CA. This module corresponds to the processing blocks S100-S160 of FIGS. 4-7 and 9. This module can e.g. be implemented by the processing circuitry 10 of FIG. 10, when running the computer program.

The communication manager 21 is for supporting communication between entities in the radio communication network. This module can e.g. be implemented by the processing circuitry 10 of FIG. 10, when running the computer program.

According to an aspect, an embodiment of a computer program of an access node of a radio communication network is presented. The computer program is for selecting one or more SCells for supporting communication with a UE by CA. The one or more SCells is/are selected from a set of SCell candidates available for the access node. The computer program comprises computer program code which, when run in an access node 2 causes the access node to estimate a probability that the UE connected to a primary cell, PCell, of the access node is in coverage of an SCell in the set of SCell candidates, estimate a spectral efficiency of a link between the UE and the SCell, predict available resources for the SCell, calculate a CA value for the SCell based on the estimated probability, the estimated spectral efficiency and the predicted available resources, perform the estimate a probability, estimate a spectral efficiency, predict available resources, and calculate a CA value for each SCell of the set of SCell candidates, rank the SCells of the set of SCell candidates based on their calculated CA values, and to select one or more SCells for providing CA with the UE based on the ranking of the respective SCell in the set of SCell candidates.

A computer program product comprising a computer program and a computer readable storage means on which the computer program is stored is also presented.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method in an access node of a radio communication network for selecting one or more secondary cells, SCells, for supporting communication with a user equipment, UE, by carrier aggregation, CA, wherein the one or more SCells is/are selected from a set of SCell candidates available for the access node, the method comprising:

estimating a probability that the UE connected to a primary cell, PCell, of the access node is in coverage of an SCell in the set of SCell candidates;

estimating a spectral efficiency of a link between the UE and the SCell;

predicting available resources for the SCell;

estimating an inter-node transport link quality value between the PCell and the SCell;

calculating a CA value for the SCell based on the estimated probability, the estimated spectral efficiency, the predicted available resources and the estimated inter-node transport link quality value;

performing the estimating a probability, estimating a spectral efficiency, predicting available resources, estimating an inter-node transport link quality value and calculating a CA value for each SCell of the set of SCell candidates;

ranking the SCells of the set of SCell candidates based on their calculated CA values; and selecting one or more SCells for providing CA with the UE based on the ranking of the respective SCell in the set of SCell candidates.

2. The method according to claim 1, wherein the probability is estimated based on inter-frequency channel quality measurements for the SCell collected from one or more inactive UEs connected to the PCell.

3. The method according to claim 2, wherein the spectral efficiency is estimated based on inter-frequency channel quality measurements for the SCell collected from one or more inactive UEs connected to the PCell.

4. The method according to claim 3, wherein the spectral efficiency is estimated based on an average of the inter-frequency channel quality measurements.

5. The method according to claim 2, wherein the available resources for the SCell are predicted based on usage history of the SCell.

6. The method according to claim 2, wherein the probability is estimated based on an average of the inter-frequency channel quality measurements.

7. The method according to claim 6, wherein the spectral efficiency is estimated based on inter-frequency channel quality measurements for the SCell collected from one or more inactive UEs connected to the PCell.

8. The method according to claim 1, wherein the spectral efficiency is estimated based on inter-frequency channel quality measurements for the SCell collected from one or more inactive UEs connected to the PCell.

9. The method according to claim 8, wherein the spectral efficiency is estimated based on an average of the inter-frequency channel quality measurements.

10. The method according to claim 1, wherein the available resources for the SCell are predicted based on usage history of the SCell.

11. An access node of a radio communication network for selecting one or more secondary cells, SCells, for supporting communication with a user equipment, UE, by carrier aggregation, CA, wherein the one or more SCells is/are selected from a set of SCell candidates available for the access node, the access node comprising:

a processing circuitry and a memory storing instructions that, when executed by the processing circuitry, causes the access node to:

estimate a probability that the UE connected to a primary cell, PCell, of the access node is in coverage of an SCell in the set of SCell candidates;

estimate a spectral efficiency of a link between the UE and the SCell;

predict available resources for the SCell;

estimate an inter-node transport link quality value between the PCell and the SCell;

calculate a CA value for the SCell based on the estimated probability, the estimated spectral efficiency, the predicted available resources and the estimated inter-node transport link quality value;

perform the estimate a probability, estimate a spectral efficiency, predict available resources, and calculate a CA value for each SCell of the set of SCell candidates;

rank the SCells of the set of SCell candidates based on their calculated CA values; and select one or more SCells for providing CA with the UE based on the ranking of the respective SCell in the set of SCell candidates.

12. The access node according to claim 11, wherein the probability is estimated based on inter-frequency channel quality measurements for the SCell collected from one or more inactive UEs connected to the PCell.

13. The access node according to claim 12, wherein the probability is estimated based on an average of the inter-frequency channel quality measurements.

14. The access node according to claim 11, wherein the spectral efficiency is estimated based on inter-frequency channel quality measurements for the SCell collected from one or more inactive UEs connected to the PCell.

15. The access node according to claim 14, wherein the spectral efficiency is estimated based on an average of the inter-frequency channel quality measurements.

16. The access node according to claim 11, wherein the available resources for the SCell are predicted based on usage history of the SCell.

17. A computer storage medium of an access node of a radio communication network for selecting one or more secondary cells, SCells, for supporting communication with a user equipment, UE, by carrier aggregation, CA, wherein the one or more SCells is/are selected from a set of SCell candidates available for the access node, the computer storage medium comprising computer program code which, when run in an access node causes the access node to:

estimate a probability that the UE connected to a primary cell, PCell, of the access node is in coverage of an SCell in the set of SCell candidates;

estimate a spectral efficiency of a link between the UE and the SCell;

predict available resources for the SCell;

estimate an inter-node transport link quality value between the PCell and the SCell;

calculate a CA value for the SCell based on the estimated probability, the estimated spectral efficiency, the estimated inter-node transport link quality value and the predicted available resources;

perform the estimate a probability, estimate a spectral efficiency, predict available resources, and calculate a CA value for each SCell of the set of SCell candidates;

rank the SCells of the set of SCell candidates based on their calculated CA values; and select one or more SCells for providing CA with the UE based on the ranking of the respective SCell in the set of SCell candidates.

\* \* \* \* \*